United States Patent [19]

Trubiano

[11] Patent Number: 5,439,253
[45] Date of Patent: Aug. 8, 1995

[54] AUTOMATIC RETRACTABLE SAFETY BELT DEVICE FOR A SEAT COMPARTMENT OF A SHOPPING CART

[75] Inventor: Antoine Trubiano, Montreal, Canada

[73] Assignee: Cari-All Inc., Montreal East, Canada

[21] Appl. No.: 226,478

[22] Filed: Apr. 12, 1994

[51] Int. Cl.⁶ .............................................. B60R 22/00
[52] U.S. Cl. .............................. 280/801.1; 280/33.993; 280/DIG. 4
[58] Field of Search .......... 280/801.1, 33.993, DIG. 4

[56] References Cited

U.S. PATENT DOCUMENTS

| | | | |
|---|---|---|---|
| 3,306,661 | 2/1967 | Allen | 280/33.993 |
| 3,350,136 | 10/1967 | Allen | 280/33.993 |
| 4,204,695 | 5/1980 | Salzman | 280/33.993 |
| 4,324,430 | 4/1982 | Dimas, Jr. et al. | 297/256.17 |
| 4,598,945 | 7/1986 | Hopkins | 297/256.17 |
| 4,655,502 | 4/1987 | Houllis | 297/229 |
| 4,666,207 | 5/1987 | Quartano | 297/229 |
| 5,238,293 | 8/1993 | Gibson | 297/229 |

Primary Examiner—Kenneth R. Rice
Attorney, Agent, or Firm—Carter & Schnedler

[57] ABSTRACT

An automatically retractable safety belt device for arresting a child seated in a seat compartment of a shopping cart. The device comprises a housing attachable to a frame member adjacent the seat compartment. An elongated strap is disposed in the housing and has a free end thereof provided with a connector and accessible from outside the housing. A retracting mechanism is provided in the housing and the inner end of the strap is connected thereto. The retractable mechanism maintains a major portion of the belt retracted in the housing. The connector at the end of the strap is attachable, when the strap is extended from the housing, whereby to position the strap in a restraining manner about a child seated in the seat compartment. When the connector is released, the belt is automatically retracted in the housing by the retracting mechanism.

14 Claims, 4 Drawing Sheets

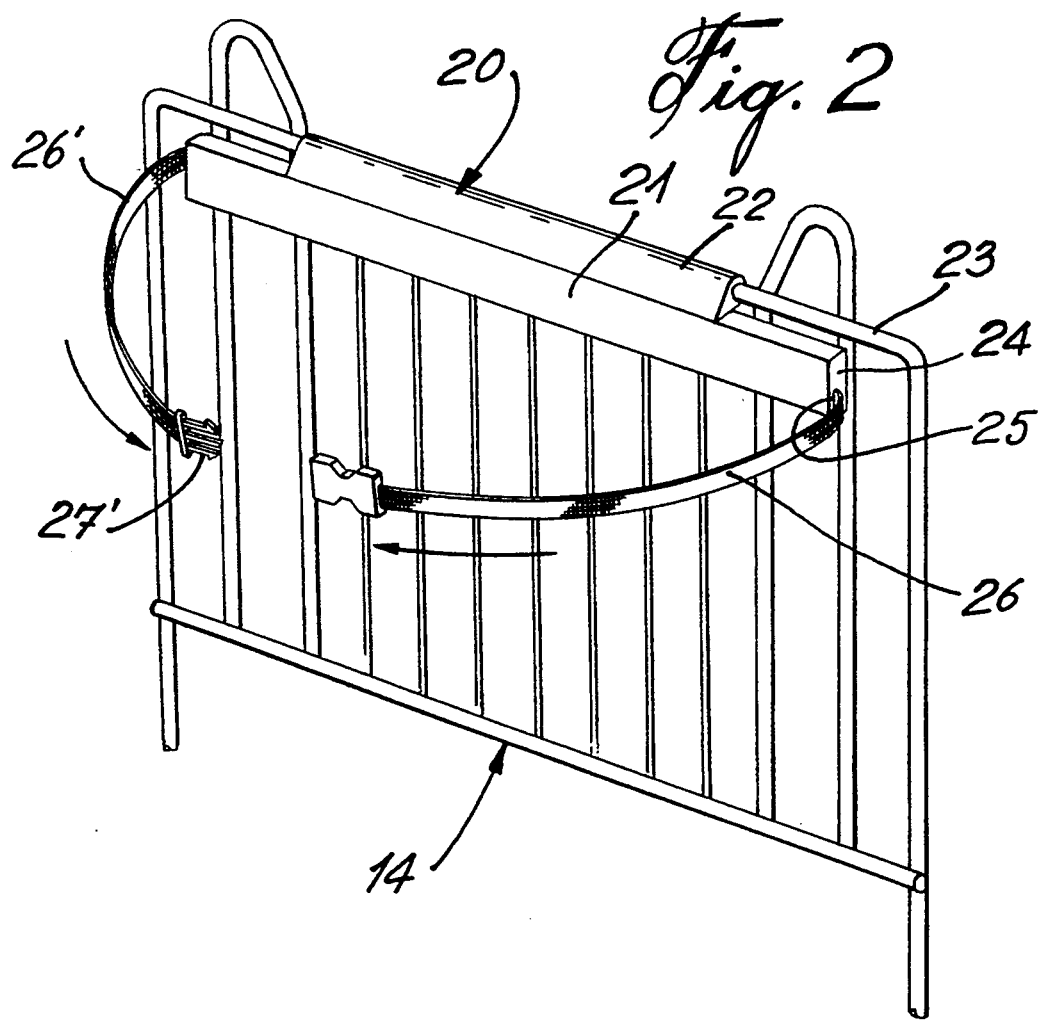
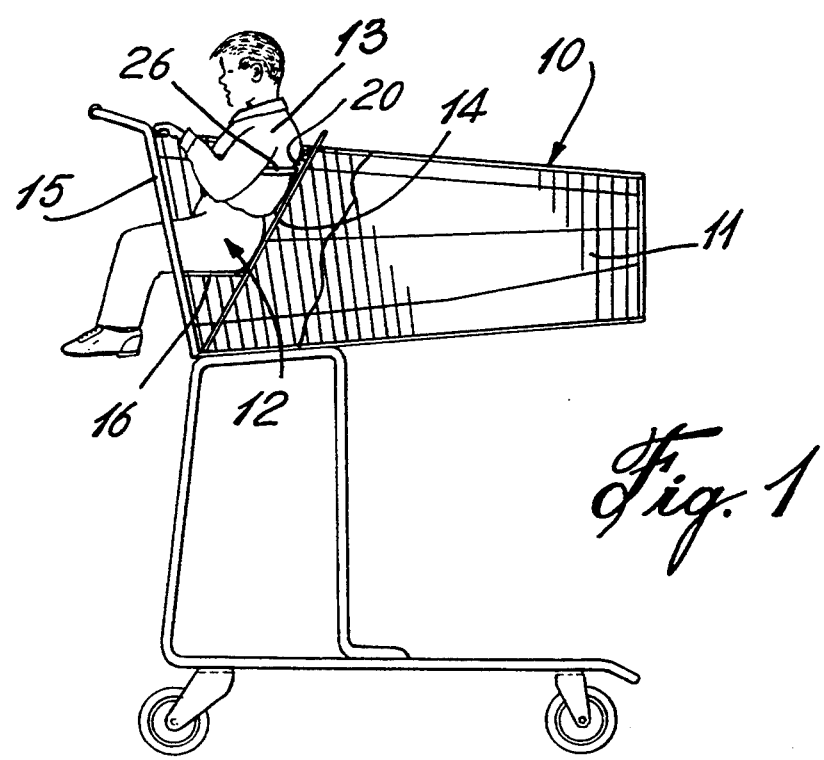

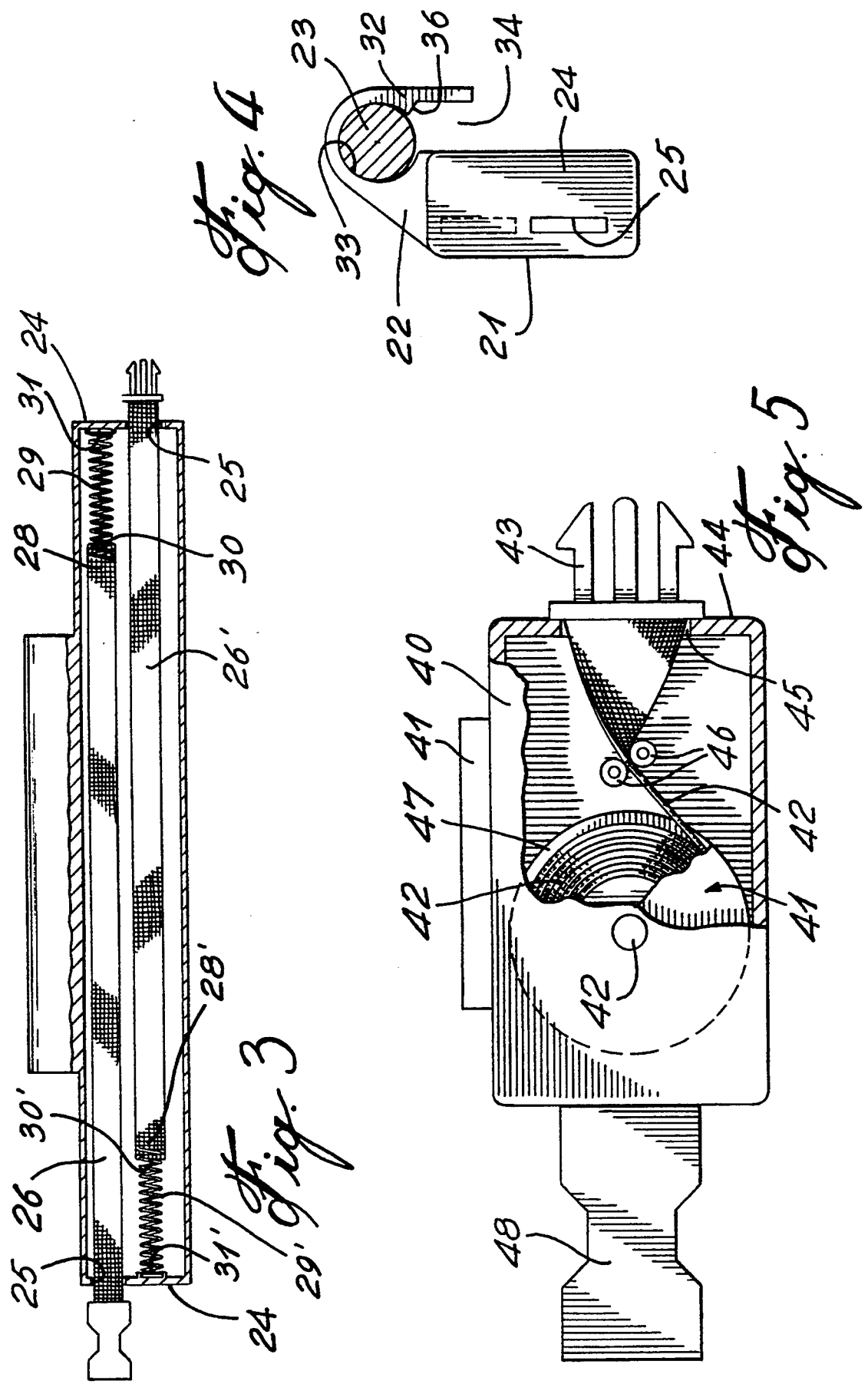

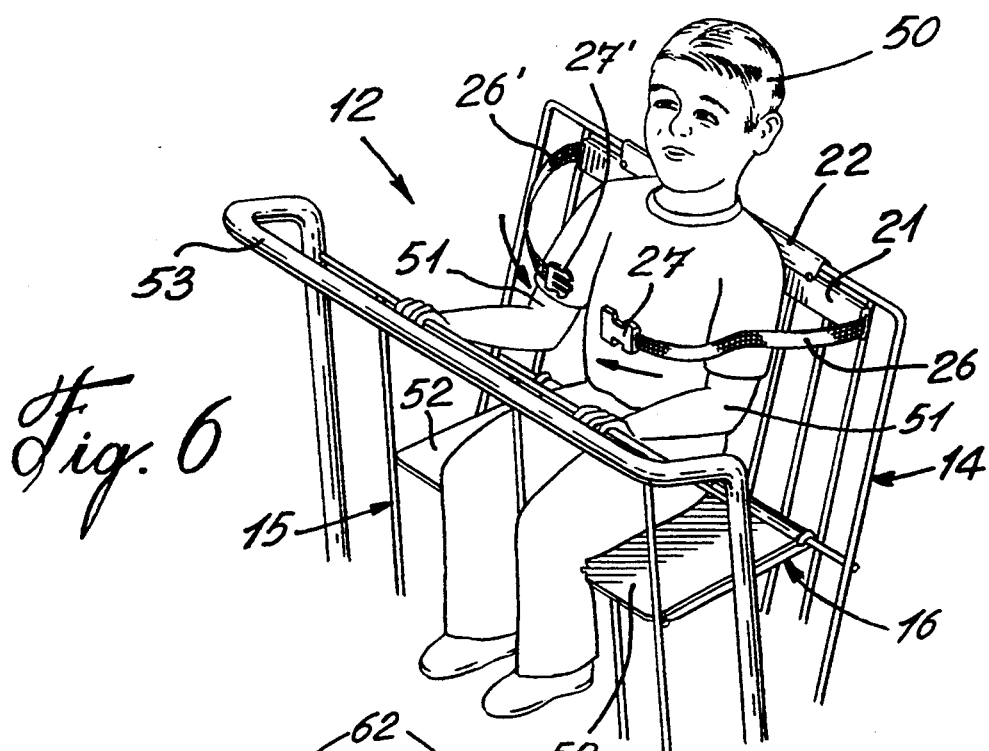
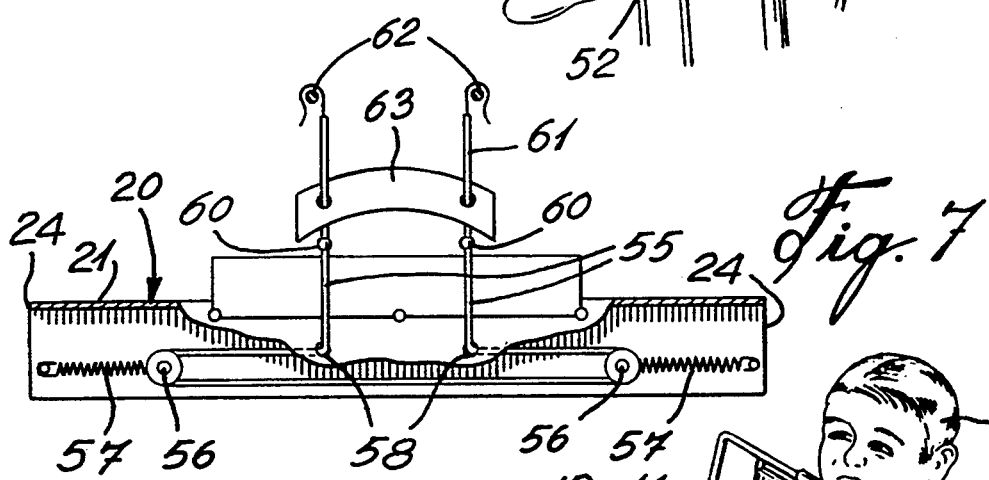
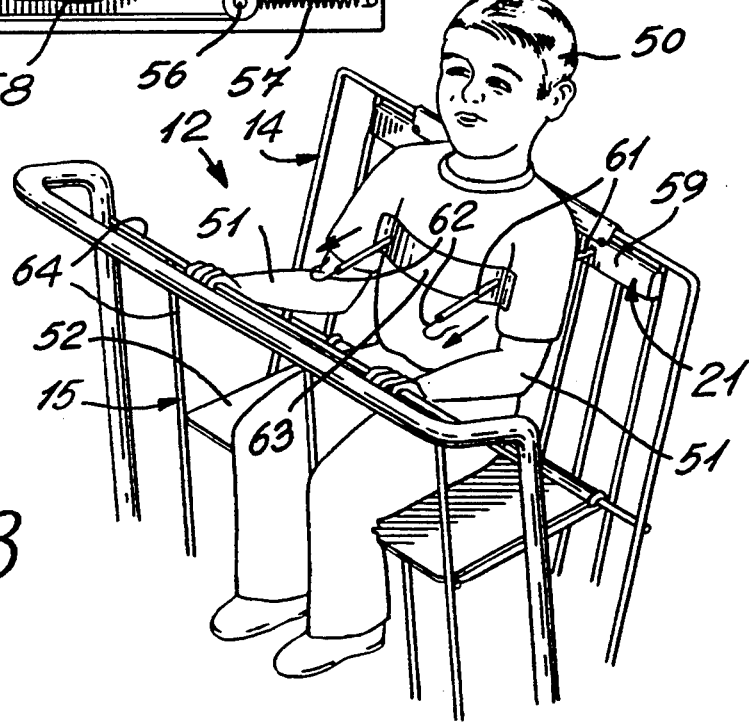

AUTOMATIC RETRACTABLE SAFETY BELT DEVICE FOR A SEAT COMPARTMENT OF A SHOPPING CART

TECHNICAL FIELD

The present invention relates to an automatically retractable safety belt device for arresting a child seated in a seat compartment of a shopping cart.

BACKGROUND OF INVENTION

It is known to provide a safety belt in association with the seat compartment of a shopping cart. The safety belt usually consists of two belt sections secured to the backrest or any other suitable frame portion of the shopping cart adjacent the seat compartment. The free end portion of the seat belt portions are provided with male and female connectors which interconnect together whereby to restrain a child seated in the seat compartment. A disadvantage of such belts is that they often tangle up with the backrest which is a hinge frame and become jammed between the backrest and the side wall of a shopping cart or the seat of the seat compartment after the child is positioned in the seat compartment. The belt is therefore unusable in this condition and it is then necessary to remove the child and untangle the belt to place it about the child. Most often, the user will not take the time to correct the situation and the child will remain seated without the safety harness about him.

Another disadvantage of these safety belts is that they are located in an area of the shopping cart where there are moving frame members, and namely, the back wall of the cart and the backrest of the seat compartment. When shopping carts are nested one within the other, the backrest will collapse on the back wall of the shopping cart and the back wall will be hinged upwardly and often cause the belt to jam between the backrest and back wall and also between the side walls of the shopping cart and often cause the connectors to break making the belts unusable.

Another disadvantage of known safety belts for baby seat compartments of shopping carts is that they are difficult to install and often require brackets which need to be secured to wire frame members of the backrest and this may be a nuisance to the child seated in the seat compartment and difficulty of repair. Known safety belts also over restrain the child preventing safe movement and cause pain.

SUMMARY OF INVENTION

It is a feature of the present invention to provide an improved automatically retractable safety belt device for arresting a child seated in a seat compartment of a shopping cart and which substantially overcomes the above-mentioned disadvantages of the prior art.

Another feature of the present invention is to provide an automatically retractable safety belt device which is easily connectable to a backrest of a seat compartment of a shopping cart and easily interchangeable.

Another feature of the present invention is to provide an automatically retractable safety belt device wherein the belt is automatically retracted within a housing, when not in use, and wherein the belt is easy to retract and attach about a child when seated in a seat compartment of a shopping cart.

According to the above features, from a broad aspect, the present invention provides an automatically retractable safety belt device for arresting a child seated in a seat compartment of a shopping cart. The device comprises a housing having securing means for securing same to a frame member adjacent the seat compartment. An elongated flexible child-restraining element of predetermined length is disposed in the housing and has a free end thereof accessible from outside the housing. Retractable means is provided in the housing with an inner end of the child-restraining element connected thereto. The retractable means maintains a major portion of the child-restraining element retracted in the housing. Connector means is provided at the free end of the child-restraining element for attaching the child-restraining element extended from the housing and positioned in a restraining manner about a child seated in the seat compartment. The child-restraining element major portion is automatically retracted in the housing when the connector means is detached.

BRIEF DESCRIPTION OF DRAWINGS

A preferred embodiment of the present invention will now be described with reference to the accompanying drawings in which:

FIG. 1 is a schematic view showing a child seated in the seat compartment of a shopping cart and arrested by the safety belt device of the present invention;

FIG. 2 is a perspective view showing the automatically retractable safety belt device of the present invention connected to a top wire member of a backrest of a seat compartment of a shopping cart;

FIG. 3 is a schematic view illustrating the construction of the automatically retractable safety belt device of the present invention and the use of helical springs as the retractable means;

FIG. 4 is an end view of the housing secured to a wire rod of a backrest frame and showing the construction of the clamp and the slot in the end wall of the housing;

FIG. 5 is a fragmented side view showing modifications of the preferred embodiment of the present invention;

FIG. 6 is a perspective view showing the manner in which the safety belt is attached a child seated in the seat compartment of a shopping cart;

FIG. 7 is a simplified schematic view showing further modifications of the preferred embodiment of the present invention;

FIG. 8 is perspective view, similar to FIG. 6, but showing a child restrained with the modified safety belt device of FIG. 7;

DESCRIPTION OF PREFERRED EMBODIMENTS

Figure 9:
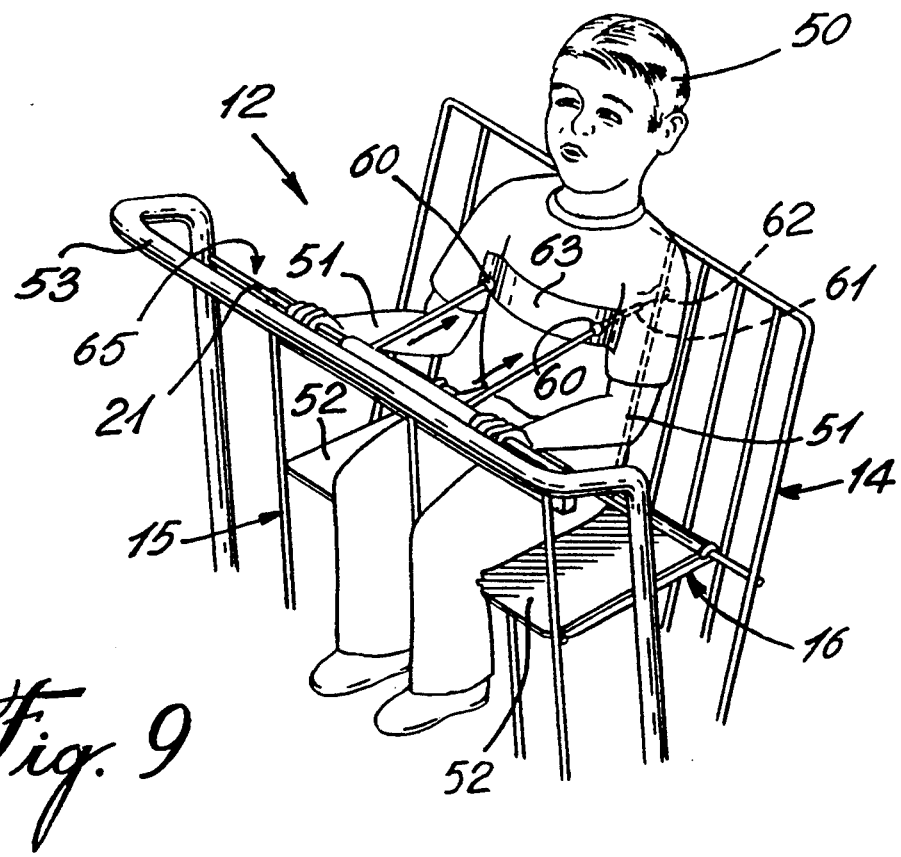
FIG. 9 is a perspective view, similar to FIG. 8, but showing the safety belt device secured adjacent the rear gate of the shopping cart instead of the backrest.

Referring now to the drawings, and more particularly to FIG. 1, there is shown at 10 a shopping cart comprised of a shopping basket 11 having a seat compartment 12 located in a rear section thereof whereby to seat a child 13 therein in the fashion illustrated. A backrest 14 is hinged at a lower end whereby to collapse against the rear wall 15 of the shopping cart when not in use, whereby to expand the area of the shopping basket 11 or when another shopping cart is nested from the rear wall which is hinged at a top end. A seat frame 16 is also hingedly secured, as well known in the art, to permit the collapsing of the backrest 14. As herein shown, a safety belt device 20 is secured to the backrest 14 and the belt 26 encircles the child 13 to restrain the child within the seat compartment 12.

Referring now additionally to FIGS. 2 to 4, there is shown, generally at 20, the automatically retractable safety belt device of the present invention. The device 20 comprises a housing 21 having securing means in the form of a clamp 22 for clamping the housing 21 on the top wire rod 23 of the backrest 14. The housing 21 is an elongated housing having opposed end walls 24 each provided with a slot 25 therein and through which a belt section 26 and 26' extend when retracted therefrom, as shown in FIG. 2. A male connector 27' is secured at the free end of the belt section 26' and a female connector 27 is connected to the free end of the belt section 26. These connectors interconnect together whereby to secure the belt sections 26 and 26' about a child to restrain same on the seat compartment, as shown in FIG. 1.

As shown in FIG. 3, the belt sections 26 and 26', also referred to herein as elongated flexible child-restraining elements, are secured at an inner end 28 and 28', respectively thereof, to a retractable means, herein shown as two helical springs 29 and 29', respectively, each having a first end 30 and 30'0 connected to their respective belts 26 and 26'. The helical springs 29 and 29' have an attaching end 31 and 31', respectively, secured in the housing remote from the slot openings 25 and herein shown as attached to their respective end walls 24 of the housing. When the springs 29 and 29' are in their normal state, as shown in FIG. 3, a major portion of the belts 26 and 26' is retracted within the housing 21. As herein shown, the springs 29 and 29' are also disposed in side-by-side relationship within the housing and the slot openings 25, as more clearly seen in FIG. 4, are located in a lower portion and an upper portion of the end walls 24, respectively, as indicated in solid and dotted lines in FIG. 4. When the belts are attached about a child, the springs are not fully extended and permit the child to move. However, as the springs are further extended, they apply a greater pulling force, keeping the belt taut over the child to exert a restraining force. Accordingly, the belt does not aggravate the child and permits safe movement. The length of the straps are such as to prevent the child from raising himself off the seat.

Referring more specifically to FIG. 4, there is shown the construction of the securing clamp 22 which is molded integrally with the housing 21. The clamp 22 has a flexible tongue 32 and defines thereunder a cylindrical through slot 33. A restricted passage 34 is defined intermediate the tongue 32 and the rear wall 35 of the housing 21. A lip 36 is formed in the rear surface of the tongue 32 for snap-fit retention to the top wire rod 23. In order to remove the housing 21, and consequently the safety belt device 20 of the present invention, it is only necessary to pry the tongue 32 outwardly whereby to permit passage of the wire rod 23 through the restricted passage 34 which has now been pried open. The clamp 22 is molded with a suitable flexible plastic material to provide flexibility and prevent breakage. This clamp design also prevents ease of assembly and removal of the device from the backrest of a shopping cart.

Referring now to FIG. 5, there is shown another version of the preferred embodiment of the automatically retractable safety belt device of the present invention. As herein shown, the device also comprises a housing 40 having a clamp 41, similar to clamp 22, for securing the housing to a wire rod member. The retractable means is herein shown as a helical coil spring retractor 41, of a type well known in the art, and securable in the housing on a rod 42 or other means which may be integrally formed with one of the side walls of the housing 40. A belt 42 is wound about the coil spring retractor 41 whereby the belt is always retracted within the housing. A male connector 43 is secured to the free end of the belt 42 and prevents the belt from being retracted fully within the housing by abutting the side wall 44 of the housing adjacent the slot 45. Guide pins 46 orient the belt so that it is aligned with the spool 47.

A female connector 48 is secured to the housing 40 at an appropriate location, or elsewhere, whereby the belt 42 may be retracted from the housing 40 to encircle a child seated in the seat compartment with the male connector 43 connected in the female connector 48. When the connector 43 is disconnected from the connector 48, the belt is automatically retracted within the housing 40, in a similar manner to the embodiment as shown in FIGS. 2 to 4.

Referring now to FIG. 6, there is shown the manner in which the belt sections 26 and 26' are secured about a child 50 seated in the babyseat compartment 12. As herein shown, the belt sections 26 and 26' are passed under the arms 51 of the child 50 with the male and female connectors 27 and 27' engaged together. These connectors are of the type that cannot be unlocked by a child once interconnected due to the restraining force thereof and the complexity of operation to a child. It is also pointed out that for added safety the housing 21 is constructed of plastics material, and a safety seat plate 52 is disposed over the seat frame 16. Also, the handlebar 53 is preferably covered with a plastics material.

Referring now to FIG. 7, there is shown a still further modification of the automatically retractable safety belt device 20, and as herein shown, the device consists of a single cable or strap 55 which is wound about a pair of pulleys 56, each connected to a retractable spring 57 attached to the end walls 24 of the housing 21. Instead of slots 25 provided in the end walls, these slots holes 58 are now positioned spaced apart a predetermined distance in a front wall 59 of the housing 21, as shown in FIG. 8. The cable or straps 55 are also provided with arresting means 60 in the form of knots or clamps to prevent the end strap sections 61 from being withdrawn within the housing 21. The free end of the strap 55 may be provided with lugs or hooks 62 to secure the belt in a restraining manner, as illustrated in FIG. 8. A safety strap or belt 63 is slidingly retained between the strap end sections 61 and is prevented from slipping out of the end sections by the hooks 62 or lugs secured to the ends of the strap end sections 61. Accordingly, as shown in FIG. 8, a child is restrained within the babyseat compartment 12 by pulling on the safety strap 63 to position a loop formed by the safety strap and strap end sections 61, and this loop is passed over the child's head and positioned under his arms 51 to fit under the armpits. If lugs are provided at the end of the strap end sections 61, then the safety strap 63 will be held in position by the retraction of the strap end sections 61 within the housing 21. Alternatively, if hooks 62 are provided at the free end of the strap end sections 61, these hooks 62 are attached to wire members, such as wire rods 64 forming the rear gate 15.

FIG. 9 shown the safety belt device of FIG. 7, but secured to a top portion 65 of the rear gate 15. With this type of attachment the hooks 62 would be secured to wire rod members 63 forming the backrest 14. However, it is pointed out that with this type of attachment it is much easier to secure the safety belt about the child as it is not necessary to pass a loop over his head. With this type of attachment all that is necessary to do to secure this safety belt about the child is to pass the strap end sections 61 under the arms of the child and simply secure the hook 62 to the wire rod 63 of the backrest 14. The arresting means or knots 60 abuts the safety strap 63 and pushes it against the child as the straps are retracted from the housing 21.

Figure 10:
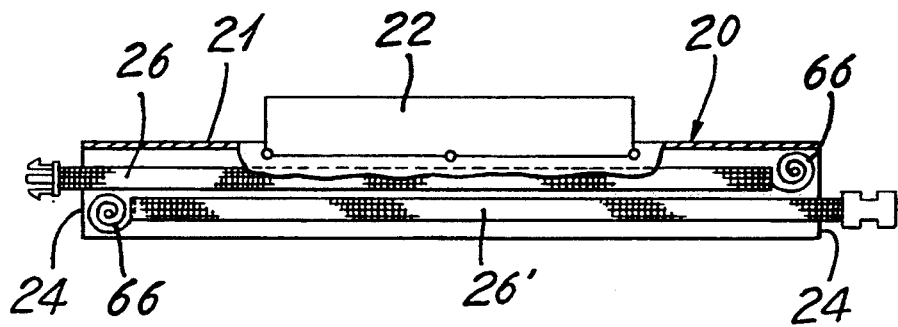
FIG. 10 is a simplified schematic view showing a still further modification of the preferred embodiment of the present invention.

Referring now to FIG. 10, there is shown a still further modification of the automatically retractable safety belt device 20 of the present invention. As herein shown, the helical springs 29 and 29' of FIG. 3 are replaced by coil springs 66 secured adjacent the end walls 24 of the housing 21 to retract the belt sections 26 and 26' within the housing 21.

It is within the ambit of the present invention to encompass any other obvious modifications of the preferred embodiment described herein, provided such modifications fall within the scope of the appended claims. For example, the strap 26, 26' and 42 may be any suitable elongated flexible child-restraining strap-like element. Also, the connectors at the free end of the straps may be differently constructed and could conceivably be attached to the side wall of the shopping cart, when in use. It is also conceivable that the safety belt device could be secured to the top of the rear hinge gate of the shopping cart rather than the backrest. Because the belt is connected to a retractable device inside the housing, there is always pressure retained on the child by the belt when the child moves within the baby seat compartment. Accordingly, the belt is always in the restraining mode. The belt is also of a selected length whereby to prevent the child from excess forward movement.

I claim:

1. An automatic retractable safety belt device for arresting a child seated in a seat compartment of a shopping cart, said device comprising a housing having clamp for securing same to a frame member adjacent said seat compartment, an elongated flexible belt of predetermined length disposed in said housing and having a free end thereof accessible from outside said housing, retractable means in said housing having an inner end of said belt connected thereto, said retractable means maintaining a major portion of said belt retracted in said housing, connector means at said free end of said belt for attaching said belt extended from said housing and positioned in a restraining manner about a child seated in said seat compartment, said belt major portion being automatically retracted in said housing when said connector means is detached.

2. A safety belt device as claimed hi claim 1 wherein said retractable means is a helical coil spring retractor having a spool about which an inner portion of said belt is wound when said major portion of said belt is retracted within said housing, a further connector secured exteriorly of said housing for engagement with said connector means at said free end of said belt when positioned in said restraining manner.

3. A safety belt device as claimed in claim 1 wherein said housing is an elongated housing, there being two of said belts extending from said housing, each belt having one of said connectors at their respective free end, said connectors being interconnectable together.

4. A safety belt device as claimed in claim 3 wherein each said belts extend out of an opening formed at opposed ends of said elongated housing.

5. A safety belt device as claimed in claim 4 wherein said retractable means is comprised to two helical springs each having a first end connected to one of said belts and a second attaching end secured in said housing remote from said opening through which their respective one of said belts extends.

6. A safety belt device as claimed in claim 5 wherein said opening formed at said opposed ends of said housing is a slot opening formed in opposed end walls of said housing, said helical springs having their first ends connected to a respective one of said opposed end walls and disposed in spaced side-by-side relationship within said housing, one of said slot openings being located in a lower portion of said end walls and the other in an upper portion thereof.

7. A safety belt device as claimed in claim 4 wherein said retractable means is comprised of two coil springs each having an attachment end connected to one of said belts, said coil springs being retained in said housing remove from said opening through which their respective one of said belts extends.

8. A safety belt device as claimed in claim 3 wherein said belts extend out of a pair of openings disposed in a front wall of said housing.

9. A safety belt device as claimed in claim 1 wherein said clamp is formed integral with said housing and provided with a flexible tongue defining thereunder a cylindrical trough and a restricted passage intermediate said tongue and said housing leading to said cylindrical trough.

10. A safety device as claimed in claim 9 wherein said frame member is a backrest of said seat compartment, said clamp being secured to a top horizontal wire rod of said backrest.

11. An automatically retractable safety belt device for arresting a child seated in a seat compartment of a shopping cart, said device comprising an elongated housing having clamp for securing same to a frame member adjacent said seat compartment, an elongated flexible belt of predetermined length disposed in said housing and having a free end thereof accessible from outside said housing, retractable means in said housing having an inner end of said belt connected thereto, said retractable means restraining a major portion of said belt retracted in said housing, connector means at said free end of said belt for attaching said belt extended from said housing and positioned in a restraining manner about a child seated in said seat compartment, said belt major portion being automatically retracted in said housing when said connector means is detached, therebeing two of said belts extending from a respective one of a pair of openings disposed in a front wall of said housing, each belt having one of said connectors at their respective free end, said connectors being interconnectable together, said belts having arresting means spaced from said free ends a predetermined distance, said arresting means maintaining a belt free end section exteriorly of said housing, and a safety strap slidingly retained between said belt free end section and displaceable between said arresting means and said connectors.

12. A safety belt device as claimed in claim 11 wherein said arresting means is a knot formed in each said belt free end section, said belt being formed by cables.

13. A safety belt device as claimed in claim 11 wherein said connectors are hooks secured to said free end of said belt free end section.

14. A safety belt device as claimed in claim 11 wherein said belt is a single belt displaceably positioned about a pair of pulleys each secured to a free end of a spring member attached to opposed end walls of said housing and disposed inwardly thereof.

* * * * *